(12) United States Patent
Daniels

(10) Patent No.: US 7,219,586 B1
(45) Date of Patent: May 22, 2007

(54) CUTTER

(76) Inventor: Martin Daniels, 38780 Lancaster, Farmington Hills, MI (US) 48331

( * ) Notice: Subject to any disclaimer, the term of this patent is extended or adjusted under 35 U.S.C. 154(b) by 0 days.

(21) Appl. No.: 09/782,353

(22) Filed: Feb. 12, 2001

(51) Int. Cl.
*B26D 5/08* (2006.01)
*B26D 7/02* (2006.01)

(52) U.S. Cl. .................. 83/599; 83/465; 83/604; 83/605; 83/917

(58) Field of Classification Search .......... 83/51, 83/56, 54, 196, 743, 747, 773, 564, 466.1, 83/471.2, 567, 599, 598, 604, 605, 674, 694, 83/DIG. 2, 465, 467.1, 600, 607, 609, 611, 83/695, 696, 917, 920, 673; 30/251, 190, 30/241
See application file for complete search history.

(56) References Cited

U.S. PATENT DOCUMENTS

| 396,339 | A | * | 1/1889 | Miller | 83/468.2 |
|---|---|---|---|---|---|
| 634,304 | A | * | 10/1899 | Mendenhall | 83/516 |
| 1,122,558 | A | * | 12/1914 | Vertunni et al. | 83/642 |
| 1,617,461 | A | * | 2/1927 | Scranton | 83/157 |
| 1,850,314 | A | * | 3/1932 | Bushaw | 83/589 |
| 2,355,320 | A | * | 8/1944 | Nebel | 83/608 |
| 2,660,241 | A | * | 11/1953 | Junkunc | 83/601 |
| 3,393,595 | A | * | 7/1968 | Halverson et al. | 83/580 |
| 3,714,856 | A | * | 2/1973 | Hall et al. | 83/453 |
| 3,726,171 | A | * | 4/1973 | Strybel | 83/643 |
| 4,130,037 | A | * | 12/1978 | Matthews | 83/56 |
| 4,401,002 | A | * | 8/1983 | Worsham | 83/468.1 |
| 4,625,607 | A | * | 12/1986 | Maillez | 83/466.1 |
| 4,706,533 | A | * | 11/1987 | Giulie | 83/599 |
| 5,251,524 | A | * | 10/1993 | Clifford | 83/383 |
| 5,934,166 | A | * | 8/1999 | Herlihy | 83/605 |
| 6,116,131 | A | * | 9/2000 | Fasske | 83/456 |

* cited by examiner

*Primary Examiner*—Boyer D. Ashley
*Assistant Examiner*—Ghassem Alie
(74) *Attorney, Agent, or Firm*—Law Offices of John Chupa & and Associates, P.C.

(57) ABSTRACT

A cutter 10 having a support member 12, a handle member 30 which is movably coupled to the support member 12, and a pair of cutting members 39, 40 which are attached to the handle member 30. The cutter 10 includes a support member 20 which receives a metal stud member 24. The cutting members 39, 40 selectively and cooperatively cut or sever the operatively and stationarily received metal stud member 24 when the handle member 30 is moved to a closed position.

1 Claim, 3 Drawing Sheets

CUTTER

FIELD OF THE INVENTION

The present invention generally relates to a cutter and more particularly, to a cutter which is adapted to efficiently cut a metal stud member and to a method for cutting a metal stud member.

BACKGROUND OF THE INVENTION

Metal stud members are used to construct walls and other portions of buildings and various structures. While these members provide significant structural advantages over wood and other members, they are relatively difficult to cut or sever.

Currently, these metal stud members are cut or severed by the use of a relatively costly and noisy apparatus which may undesirably produce sparks and other undesirably by-products (e.g., airborne metal particulates) which may be hazardous to one's health and which may create relatively serious environmental difficulties.

There is therefore a need for a new and improved cutter and a cutting methodology which is adapted to efficiently cut or sever a metal stud member and which overcomes some or all of the previously delineated drawbacks associated with prior metal stud cutting apparatuses and methodologies.

SUMMARY OF THE INVENTION

It is a first non-limiting advantage of the present invention to provide a cutter which efficiently cuts a metal stud member and which overcomes some or all of the previously delineated disadvantages of prior cutter and methodologies.

It is a second non-limiting advantage of the present invention to provide a cutter which efficiently cuts a metal stud member and which overcomes some or all of the previously delineated disadvantages of prior cutter members and which may be further adapted to cut or sever a wide variety of members.

According to a first aspect of the present invention, a cutter is provided and includes a first support member; a second stud reception member which is perpendicularly attached to the first support member; and a second handle member which is attached to the first support member and which includes a pair of severing members.

According to a second aspect of the present invention, a cutter is provided and includes a metal stud reception assembly; and a cutting assembly which is deployed proximate to one end of the stud reception assembly and which is selectively movable between an open and a cutting position.

According to a third aspect of the present invention, a method for cutting a metal stud member is provided. The method includes the steps of stationarily positioning the metal stud member upon a member; providing a pair of engagement positions; and selectively causing the pair of engagement portions to selectively cut the metal stud member.

These and other features, aspects, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
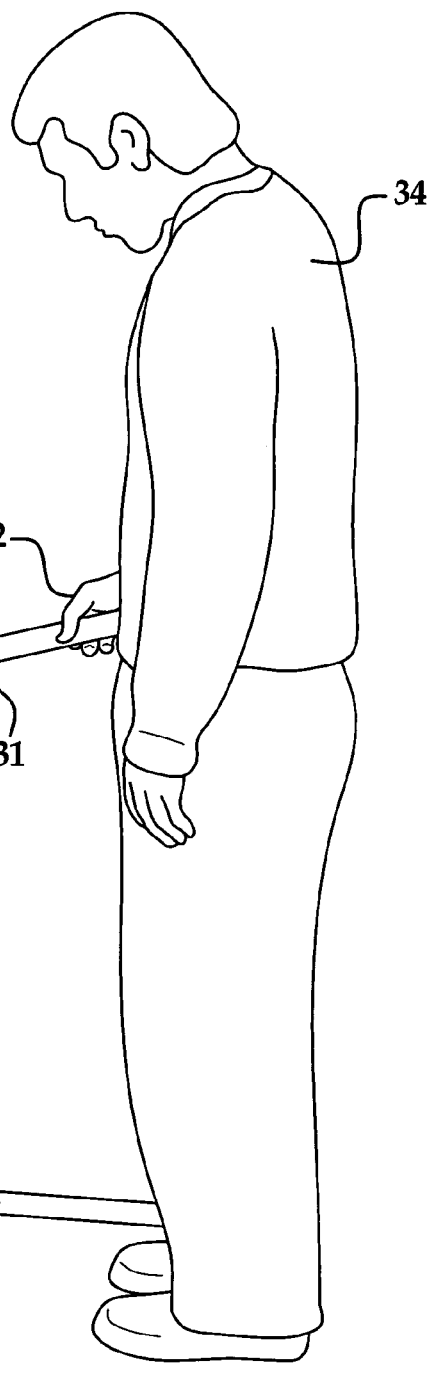
FIG. 1 is a perspective view of a cutter made in accordance with the teachings of the preferred embodiment of the invention in combination with a user.

Referring now to FIGS. 1–4, there is shown a cutter 10 which is made in accordance with the teachings of the preferred embodiment of the invention.

Particularly, cutter 10 includes a first support member 12 which is adapted to be placed upon the ground 14 or other support surface and which includes a first relatively thin portion 16 and a second relatively thick portion 18. Member 12 may have a generally rectangular or substantially round/oval cross sectional area and may be formed from conventional steel or metal.

Portions 16 and 18 may have a substantially similar cross sectional area. Cutter 10 further includes a metal stud reception member 20 which is attached to the portion 18 by the use of welded connections 22 or by substantially any other conventional connection methods. As shown, metal stud reception member 20 has a general rectangular or cross sectional area. Further, the longitudinal axis of symmetry 21 of member 20 is substantially perpendicular to the longitudinal axis of symmetry 13 of member 12 and hence, member 20 is "perpendicularly attached" to member 12. Moreover, member 20 has a thickness which is substantially similar to the thickness of a metal stud 24. In other non-limiting embodiments of the invention, member 20 may comprise a telescoping member in order to allow the member 20 to be dynamically adjustable along its length or longitudinal axis 21, effective to allow member 20 to operatively support a wide variety of studs 24 of different lengths. Member 20 further includes a pair of substantially identical feet 26, each of which is coupled to and/or integrally formed with a unique and opposed end of member 20, which are each perpendicularly coupled to member 20, and which cooperatively support member 20 upon the ground or support surface 14.

Cutter 10 further includes an outwardly projecting serpentine shaped handle member 30 having a first thin portion 31 which has an end which is adapted to be held in the hand 32 of a user 34 and a second relatively thick portion 36 which is attached to the portion 18 by bushing 38 or by substantially any other conventional attachment member or methodology. Further, handle member 30 includes a pair of substantially identical cutter or severing members 39, 40 which are respectively attached to the portion 36 by the use of bushings 42, 44.

Particularly, each cutting member 39, 40 includes a first member 50 and a pair of relatively sharp edged engagement members 52, 54 which are each respectively attached to the respective member 50 by bushing 56. Hence, handle member 12 and severing members 39, 40 cooperatively form a "cutting assembly", while support member 16 and member 20 cooperatively form a support assembly.

Figure 2:
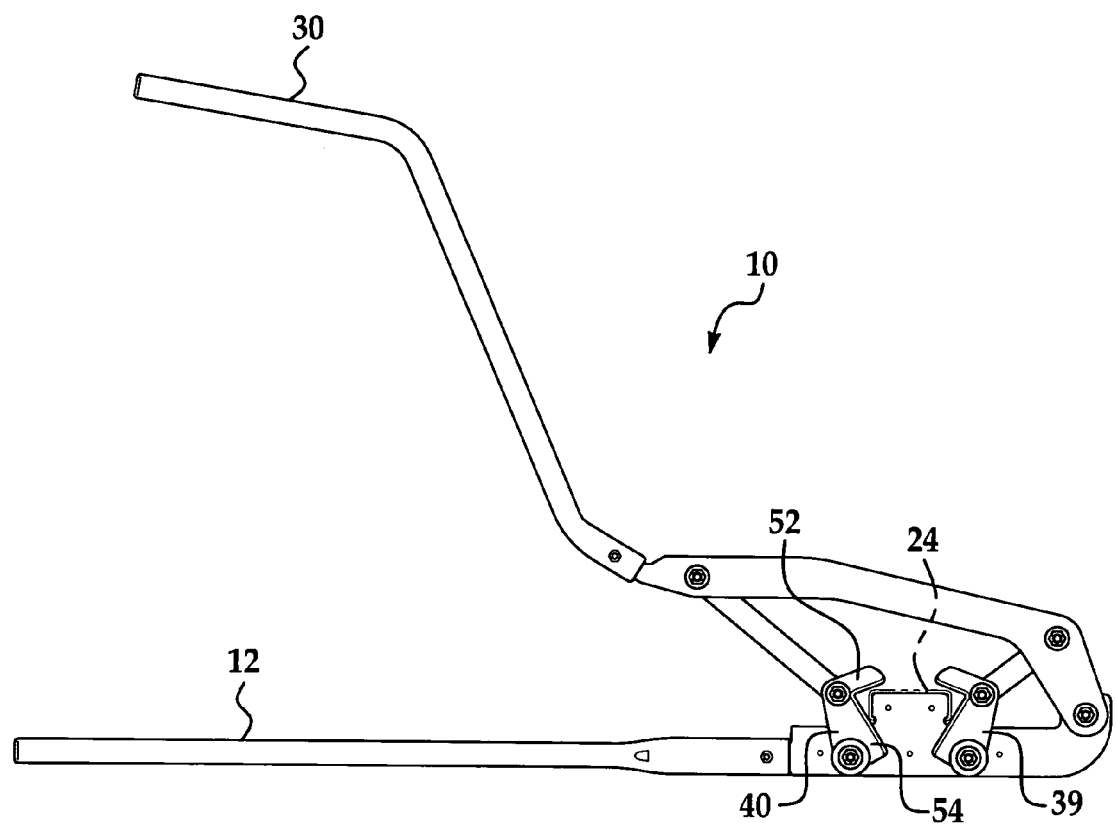
FIG. 2 is a side view of the cutter which is shown in FIG. 1 in an open position.
Figure 3:
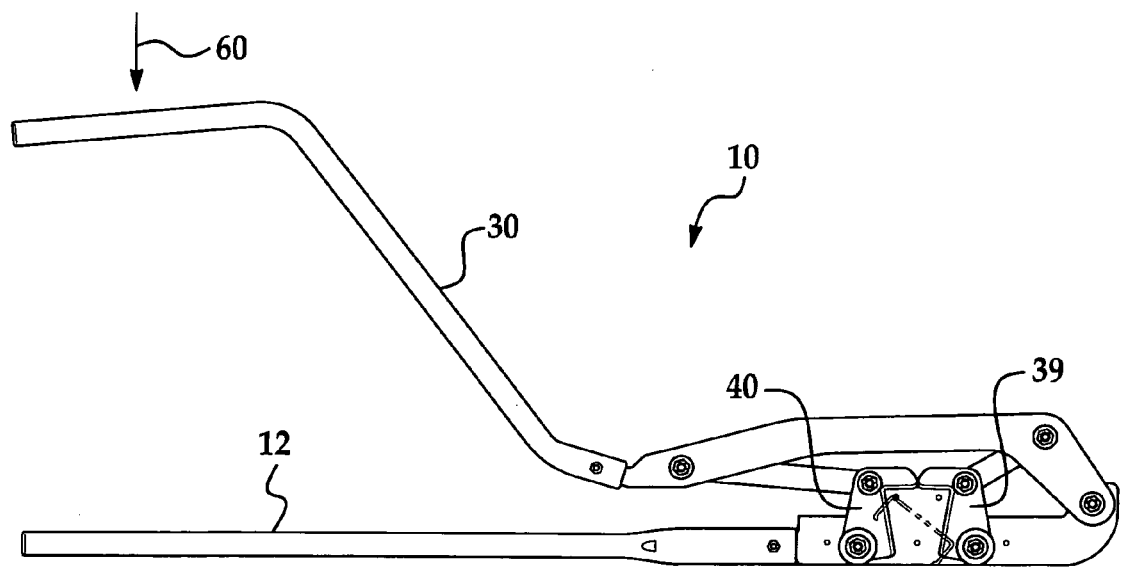
FIG. 3 is a view which is substantially similar to the view of FIG. 2 but showing the cutter in a closed position.
Figure 4:
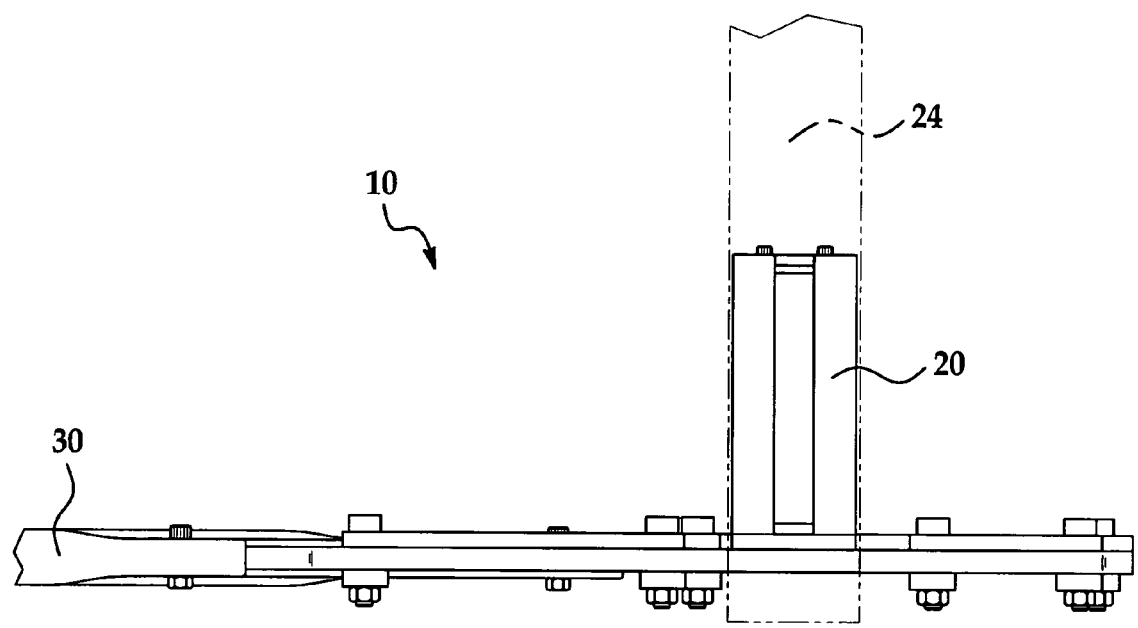
FIG. 4 is a top view of the cutter which is shown in FIGS. 1 and 2.

In operation, the stud member 24 is operatively and stationarily placed upon the stud support member 20 while the cutter 10 is in the open position (see FIG. 2). After the metal stud member 24 is stationarily placed upon the support member 20, the handle member 30 is pushed or moved downward in the direction of allow 60, (see FIG. 3), thereby causing the engagement members 52, 54 of each cutting member 39, 40 to cooperatively and efficiently sever or cut the stud member 24 without causing the relatively loud noise, sparks, and the creation of airborne metal particulates associated with and/or created by prior cutters.

It is to be understood that the invention is not limited to the exact construction or method which has been illustrated and discussed above, but that various changes and modifications may be made without departing from the spirit and the scope of the inventions as are more fully delineated in the following claims. It should be further understood that cutter 10 my selectively sever or cut members while are composed or formed from wood or a variety of other materials.

What is claimed is:

1. A cutter comprising a first support member having a first thick portion and a second thicker portion, side first support member having a first longitudinal axis of symmetry;
    a metal stud reception portion which has a rectangular cross sectional area, said metal stud portion is coupled to said second thicker portion and has a second longitudinal axis of symmetry which is perpendicular to said first longitudinal axis of symmetry, said metal stud reception portion having first and second opposed ends and further includes first and second substantially identical feet respectively coupled to the first and second opposed ends, said first and second feet are perpendicular to the second longitudinal axis of symmetry;
    a serpentine-shaped handle having a third thick portion which is movably coupled to the first thick portion and a forth hand held thick portion which projects substantially above and away from the first support member;
    said cutter further comprises first and second substantially identical cutting members, each of the first and second cutting members includes a substantially L-shaped sharp edged engagement member which at one end is movably attached to the third thick portion of the serpentine handle and the at other end pivotally attached to the first support member, said substantially L-shaped sharp edged engagement member of the first cutting member is operatively positioned along a first side of the stud reception member and the substantially L-shaped sharp edged engagement member of the second cutting member is positioned along a second side opposite to the first side of the stud reception member,
    and wherein a downward movement of the forth thick portion of the serpentine handle towards the first thick portion of the first support member causing the first and second cutting members to move downwardly toward the second thicker portion, thereby causing the first and second cutting members to simultaneously move together, thereby allowing the substantially identical L-shaped shaped sharp edged engagement members to cooperatively and selectively cut a metal stud as the substantially L-shaped engagement members move toward one another.

* * * * *